(12) United States Patent
Ionescu et al.

(10) Patent No.: US 8,315,279 B2
(45) Date of Patent: Nov. 20, 2012

(54) TELECOMMUNICATIONS SYSTEM AND METHOD FOR CONNECTING SEVERAL CSTA CLIENTS TO A PBX

(75) Inventors: Alexandru Ionescu, Bucharest (RO); Christian-Ionut Lup, Bucharest (RO)

(73) Assignee: Poltys, Inc., Anderson, SC (US)

( * ) Notice: Subject to any disclaimer, the term of this patent is extended or adjusted under 35 U.S.C. 154(b) by 1063 days.

(21) Appl. No.: 12/257,012

(22) Filed: Oct. 23, 2008

(65) Prior Publication Data

US 2009/0238171 A1    Sep. 24, 2009

(30) Foreign Application Priority Data

Mar. 20, 2008  (RO) .............................. A2008/00219

(51) Int. Cl.
*H04J 3/04*    (2006.01)

(52) U.S. Cl. ....................................... 370/535; 709/224
(58) Field of Classification Search ........................ None
See application file for complete search history.

(56) References Cited

U.S. PATENT DOCUMENTS

| | | | | |
|---|---|---|---|---|
| 8,139,565 | B2 * | 3/2012 | Ionescu | 370/352 |
| 2001/0054107 | A1 * | 12/2001 | Aufderheide | 709/237 |
| 2002/0110113 | A1 * | 8/2002 | Wengrovitz | 370/352 |
| 2004/0064549 | A1 * | 4/2004 | Brown et al. | 709/224 |
| 2008/0052309 | A1 * | 2/2008 | Underseth | 707/102 |

* cited by examiner

*Primary Examiner* — Gregory Sefcheck
*Assistant Examiner* — Salvador E Rivas
(74) *Attorney, Agent, or Firm* — Overhauser Law Offices LLC

(57) ABSTRACT

A system connects a plurality of CSTA Clients to a communications system that supports only one CSTA Client at a time, such as a PBX. The system includes a server or other processor programmed to provide a CSTA dialog with each of the plurality of CSTA Clients, and a single CSTA dialog with the PBX.

9 Claims, 6 Drawing Sheets

TELECOMMUNICATIONS SYSTEM AND METHOD FOR CONNECTING SEVERAL CSTA CLIENTS TO A PBX

CROSS-REFERENCE TO RELATED APPLICATIONS

This application claims the benefit of Romanian Patent Application No. A2008/00219, filed Mar. 20, 2008, and titled TELECOMMUNICATIONS SYSTEM AND METHOD FOR CONNECTING SEVERAL CSTA CLIENTS TO A PBX, which is incorporated herein by reference.

SUMMARY

The present invention may comprise one or more of the features recited in the attached claims, and/or one or more of the following features and combinations thereof.

The invention relates to a telecommunication system that consists of a Communications System (PBX) that can work with only one client application (CA) over the Computer-Supported Telecommunications Applications (CSTA) protocol, a server (S) that runs a specialized multiplexer type application (SMA) and several CSTA Client Applications (CA1, ... CAn) that can be simultaneously connect to the server through the SMA.

Some PBXs only accept one CSTA connection at a time. This only allows one telephony application to be connected and work with the PBX in the same time. There is a large variety of Computer Telephony Integration (CTI) applications that can be used in conjunction with a PBX, each application serving a certain need (call center applications, call billing and accounting, status monitoring, etc.). Having a PBX that can only connect with one application at a time is a major limitation for some users since their work environment might require that multiple applications work with the PBX simultaneously.

The present invention is used to provide a way to simultaneously connect multiple CA to a PBX that can only support one CSTA connection with a CA at a time.

This method is implemented by a specialized multiplexer type application SMA. The SMA application connects on one side to the PBX through one CSTA link and on the other side to multiple clients (CA1, ... CAn) via one CSTA link for each client. The SMA application multiplexes the simultaneous CSTA communications with the (CA1 ... CAn) clients into one CSTA communication with the PBX so that the PBX is led to believe that it only interfaces with one CSTA CA.

Additional features of the disclosure will become apparent to those skilled in the art upon consideration of the following detailed description of the illustrative embodiment.

BRIEF DESCRIPTION OF DRAWINGS

The detailed description particularly refers to the accompanying figures in which.

DESCRIPTION OF THE ILLUSTRATIVE EMBODIMENTS

Figure 1:
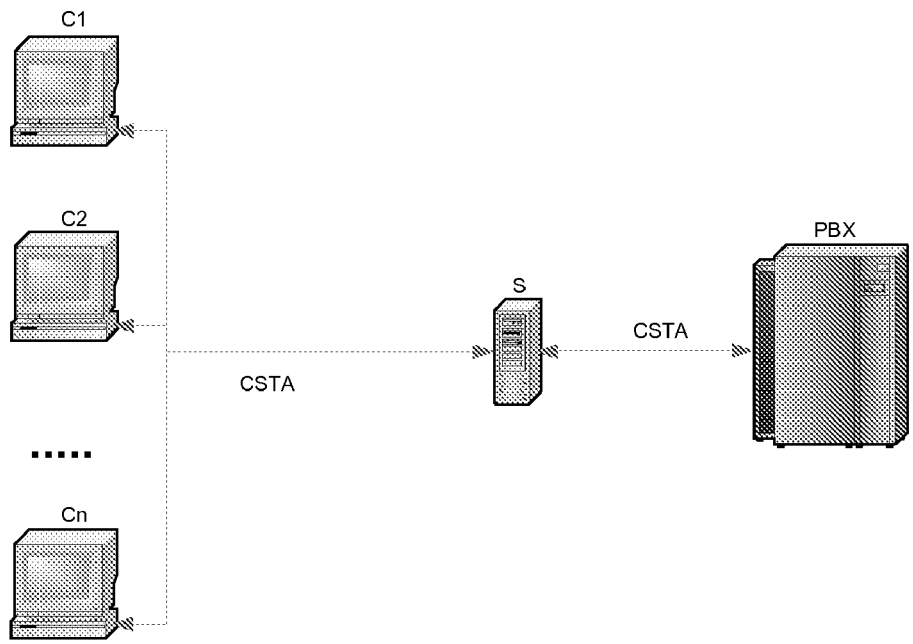
FIG. 1, general telecommunications system diagram, in accordance with the invention.

For the purposes of promoting and understanding the principals of the invention, reference will now be made to one or more illustrative embodiments illustrated in the drawings and specific language will be used to describe the same.

Overview of the Operation

The telecommunications system implementing the invention, solves the disadvantage mentioned above.

The method for connecting several CSTA CA to a PBX, is implemented by the telecommunications system described above. As seen in FIG. 1 a server (S) that runs the specialized multiplexer type application SMA implementing the method that is the subject of this invention is interposed between the PBX and the multiple CA. The SMA multiplexes the simultaneous CSTA communications from (CA1 ... CAn) into one CSTA communication with the PBX.

The SMA comprises of two main processes: a CSTA dialogue that takes place between one or more CSTA clients (CA1, ... CAn) and the SMA and a CSTA dialogue that takes place between the PBX and the specialized application multiplexer type SMA.

For the first dialogue process between the server through the SMA and the CSTA CA, consists of the following steps:

a. wait for a connection attempt from a CSTA client, and if this connection is established, b. wait for the CSTA client to send an ACSE (Association Control Server Element) Request message;

c. check if the SMA has an accepted connection with the PBX, and if not, reply to the CSTA client with ACSE Rejected message and loop back to the point where an ACSE Request message is waited on;

d. when ACSE Request message is received, if the SMA has an accepted connection with the PBX, as a result, send ACSE Accepted message to the CSTA client and start waiting on messages from the CSTA client. Next, for every message received from the CSTA client, check if it is a CSTA Invoke, and if so, process this message, check if it is a CSTA Response, if it is not a CSTA Invoke, and if it is a CSTA Response, ignore the message, check if the message is ACSE Release, if it is not a CSTA Response, and when it is not ACSE Release, check if it is ACSE Abort, and if it is not even ACSE Abort, ignore the message;

e. if the message is ACSE Abort, close the CSTA client connection; if the message is ACSE Release, send ACSE Release Response and close the CSTA client connection.

The connecting method, in accordance with the invention, for the second dialogue process between the server, through the SMA, and the PBX, consists of the following steps:

f. try to connect the SMA to the PBX, and if the attempt is not successful, g. wait ten seconds and then, h. try to connect again to the PBX. When the connection succeeds, send ACSE Request to the PBX, i. check if the association is accepted, and if not, wait five seconds and then loop back to the step where ACSE Request is sent; when the association is accepted, start waiting on CSTA messages from the PBX;

j. for every CSTA message received from the PBX, if it is a CSTA Response, process this Response; check if it is a CSTA Invoke, if it is not a CSTA Response, and if it is a CSTA Invoke, process this Invoke; ignore the message if it is not a CSTA Invoke.

Below is presented how the invention can be implemented as described in FIGS. 1-7.

Detailed Telecommunication System Operation

Figure 2:
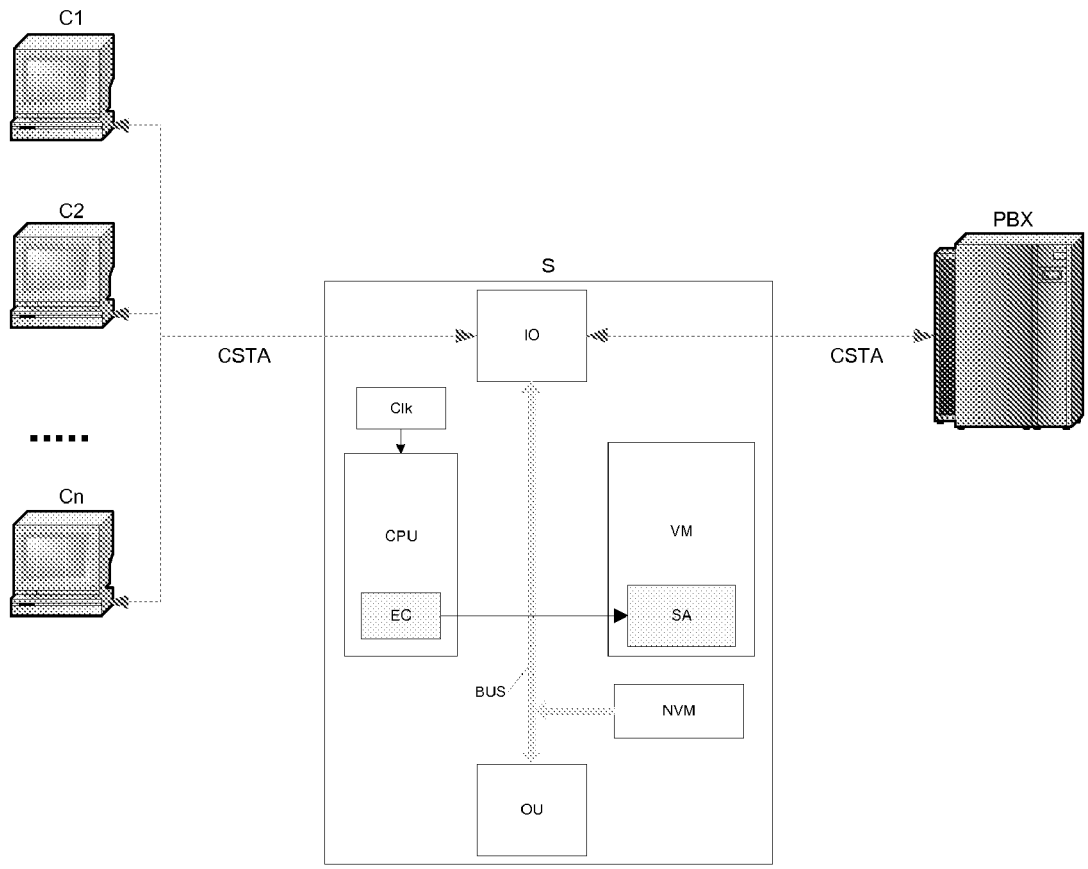
FIG. 2, functional block diagram of the telecommunications system.

The telecommunications system, as described in FIGS. 1 and 2, consists of a PBX that supports only one CSTA client, a server (S) on which a specialized application SMA (CSTA multiplexer) is running, and several CSTA client applications CA1, . . . , CAn that can be simultaneously linked to the server (S). The specialized application SMA, that runs on the server (S,) is perceived by the PBX as the only CSTA CA. The CSTA (CA1, . . . Can), are each connected to the SMA via a separate CSTA connection and each CA believes it is the only CA connected to the PBX.

Server Operation

A. According with FIG. 2, the server (S) consists of a central processing unit CPU, a nonvolatile memory (Flash/ROM type) NVM, a volatile memory (RAM type) VM, an input/output units block (Ethernet/USB type) IO, an optional external data storage units block OU and a clock Clk which provides a periodical signal that assures the synchronization between the components of the server S. The functional elements of the server (S) are interconnected through a data bus BUS.

B. The central processing unit CPU coordinates the activity of the entire system, assures the data processing, including interpretation, processing and control, supervises the information transfers and controls the applications execution. The nonvolatile memory NVM is a permanent type memory that stores information needed for server initialization at startup. The volatile memory VM is used, usually, to load the programs that run on the system and for data and variables storage. In this VM memory is loaded also, at runtime, with the specialized CSTA multiplexer type application SMA and are stored the data received and processed by it. The input/output units block IO assures the connectivity of the system with the environment by receiving and transmitting the information from and to the external devices connected or through the data transmission environments. This block makes possible the communication between the server (S) and the PBX, but also between the server (S) and the CSTA clients CA1, . . . , CAn. The OU block is optional and allows attaching auxiliary external data storage devices with large capacity (e.g. HDD).

C. In the volatile memory VM is loaded the specialized application SMA (CSTA multiplexer type). Its execution is controlled by the execution control module EC of the central processing unit. The application operates by receiving and sending messages from and to the PBX, and also from and to the CSTA clients CA1, . . . , CAn. By processing the messages from the CSTA clients CA1, . . . , CAn, it generates messages to the PBX or to the CSTA clients as direct responses. By processing the messages from the PBX, it generates messages to the CSTA clients CA1, . . . , CAn or responses to the PBX.

D. In the server S, the data flows generated while executing the specialized application SMA (CSTA multiplexer type) that runs on this machine are as follows:

Between the input/output units IO and the volatile memory VM, on one hand, are received responses or events from the PBX and are transmitted messages to the PBX. On the other hand, are received messages from the CSTA clients CA1, . . . , CAn and are transmitted responses and events to the CSTA clients.

Between the volatile memory VM and the central processing unit CPU, on one hand, are transmitted for processing messages from the PBX and are generated messages to the PBX, which are transmitted further through the input/output units block IO. On the other hand are transmitted for processing messages from the CSTA clients CA1, . . . , CAn and are generated responses or events for the CSTA clients, which are transmitted further through the input/output units block IO.

All data flows are transmitted through the data bus BUS.

SMA Operation

SMA is a method for connecting several CSTA CA to a PBX that supports connection with only one CSTA CA at a time. The SMA comprises of two main processes.

a. A CSTA dialogue that takes place between one or more CSTA clients (CA1, . . . CAn) and the SMA running on the server S b. A CSTA dialogue that takes place between the PBX and the specialized application multiplexer type SMA that is running on the server S.

Figure 3:
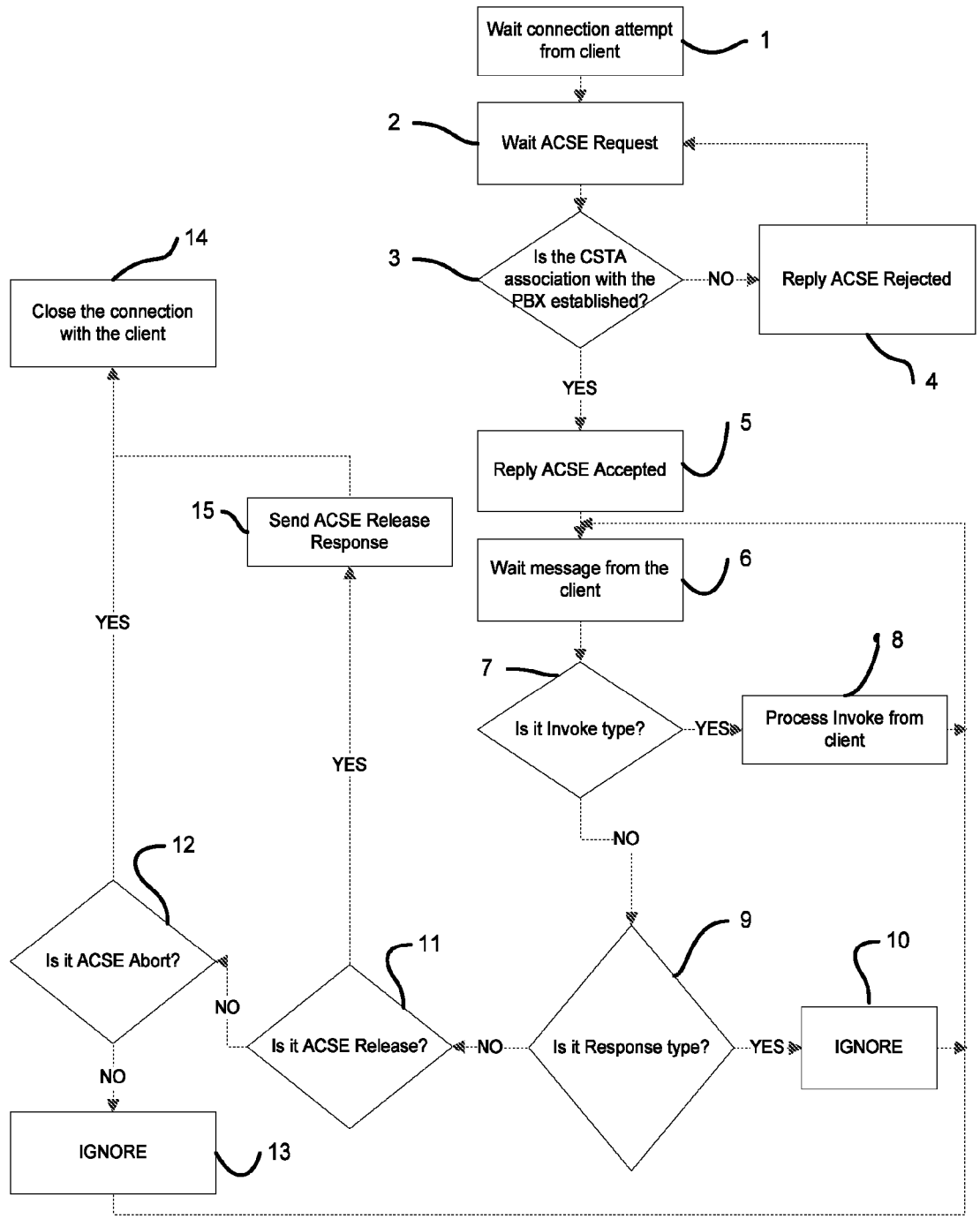
FIG. 3, functional diagram of the multiplexer method describing the communication between the SMA and the CA clients over CSTA.

The first CSTA dialogue process (SMA Operation A) is described in FIG. 3:

Wait, at step 1, a connection (connection request) from one of the CSTA clients CA1, . . . , CAn, and if this connection is established, at step 2 wait for the CSTA client to send an ACSE Request message, where ACSE (Association Control Server Element) is an association element for server control. Further, at step 3 check if the SMA has an accepted connection with the PBX, and if it has not an accepted connection, go to step 4 where the ACSE Rejected CSTA message is sent to the CSTA client and go back to step 2 to wait again an ACSE Request message. If at step 3 the SMA has an accepted connection with the PBX, at step 5 reply to the CSTA client with an ACSE Accepted CSTA message, and at step 6 start waiting messages from the CSTA client.

For every received message (step 6) from the CSTA client, at step 7 check if the message is CSTA Invoke type, and if the message is CSTA Invoke type, process through step 8 the CSTA Invoke message from the CSTA client. If at step 7 the message is confirmed to be CSTA Invoke type, at the next step 9 check if the message is CSTA Response type, and if it is CSTA Response type, at step 10 the message is ignored. If the message is not CSTA Response type, then at step 11, check if the message is ACSE Release. If the message is not ACSE Release, at step 12 check if the message is ACSE Abort, and if it is not ACSE Abort, the message is ignored at step 13. If at step 12 the message is confirmed to be ACSE Abort, close the connection with the CSTA client at step 14. If at step 11 the message is confirmed to be ACSE Release, send by step 15 the CSTA Response for ACSE Release to the CSTA client and close the connection with the CSTA client a1 step 14.

Figure 4:
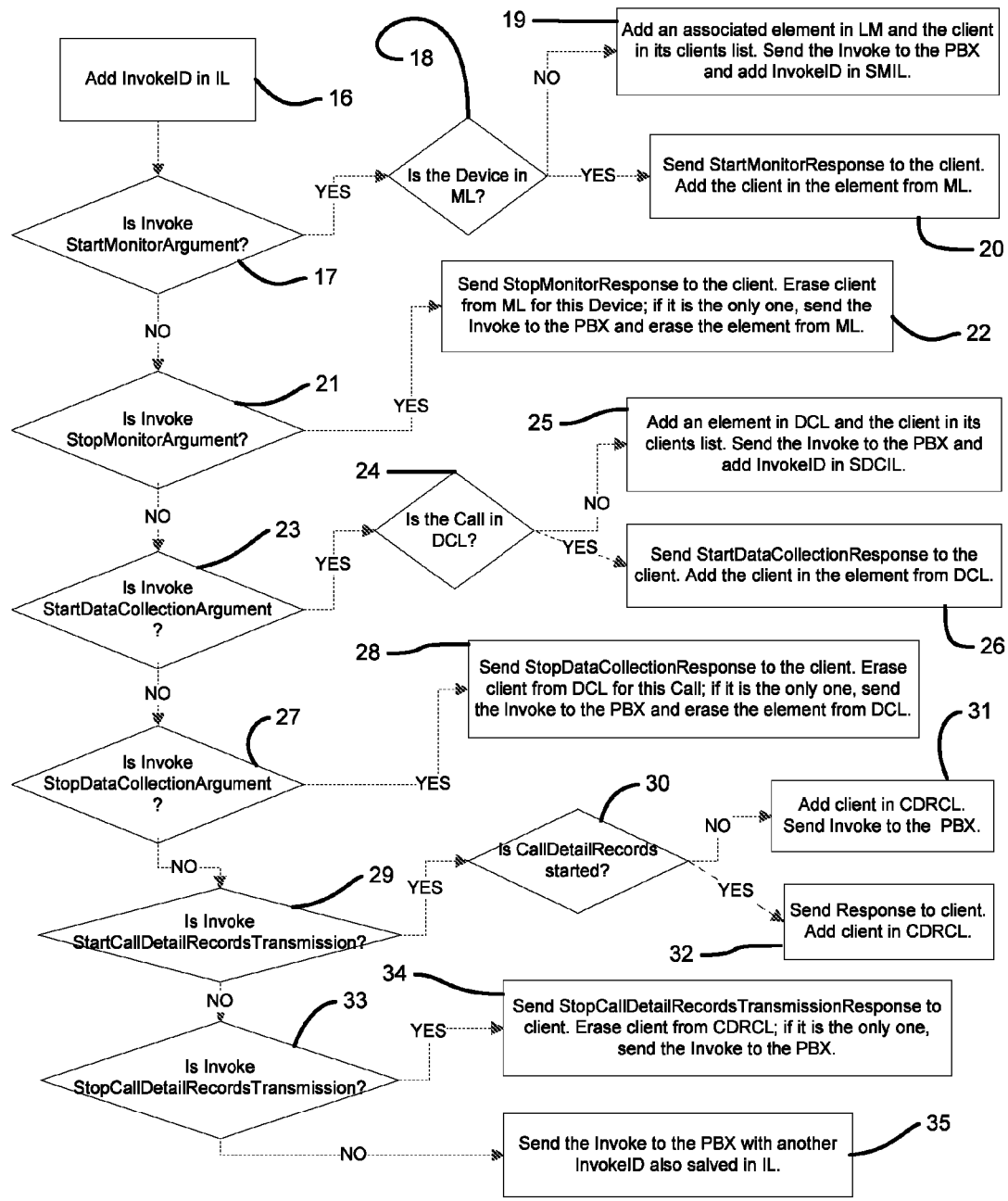
FIG. 4, processing diagram for the Invoke from the CSTA CA client.

The processing of the CSTA Invoke message from the CSTA client, at step 8 above, is illustrated in FIG. 4 and described below:

At step 16 insert the InvokeID in the non-processed Invokes list (IL) and then pass to step 17 and check if Invoke is StartMonitorArgument. If so, at the next step 18 check if Device has an associated element in the monitoring list (ML). If not, at step 19 add an element associated to the Device in the monitoring list (ML), add as well the CSTA client in the CSTA clients list of this element, and send StartMonitorArgument to the PBX adding the InvokeID also in the non-processed StartMonitor Invokes list (SMIL). If the Device has an associated element in the monitoring (ML) at step 18, at step 20 send StartMonitorRespose (previously saved) to the CSTA client and add this client in the CSTA clients list of the element associated to the Device in the monitoring list (ML).

If at step 17 Invoke is not StartMonitorArgument, at step 21 check if Invoke is StopMonitorArgument, and if so, at the next step 22 send StopMonitorResponse to the CSTA client, delete this client from the CSTA clients list of the element associated in ML to this Device, and if this CSTA clients list becomes empty, then send StopMonitorArgument to PBX and erase the element associated to the Device from the monitoring list (ML).

If at step 21 Invoke is not StopMonitorArgument, at step 23 check if the Invoke is StartDataCollectionArgument. If so, at the next step 24 check if the Call has an associated element in the data collecting list (DCL). If not, at step 25 add an element associated to the Call in the data collecting list and add the CSTA client in the CSTA clients list of the element associated to the Call, and send StartDataCollectionArgument to the PBX, adding the InvokeID also in the non-processed StartDataCollection Invokes (SDCIL). If at step 24 the Call has an associated element in the data collecting list (DCL), at step 26 send StartDataCollectionReponse (previously saved) to the CSTA client, and add the CSTA client in the CSTA clients list of the element associated to the Call in the data collecting list (DCL). If at step 23 Invoke is not StartDataCollectionArgument then at the next step 27 check if Invoke is StopDataCollectionArgument. If so, at the next step 28 send StopDataCollectionResponse to the CSTA client, erase this client from the CSTA clients list of the element associated to this Call in the data collecting list (DCL), and if this CSTA clients list becomes empty, then send StopDataCollectionArgument to the PBX and delete the element associated to the Call from the data collecting list (DCL).

If at step 27 Invoke is not StopDataCollectionArgument, at step 29 check if Invoke is StartCallDetailRecordsTransmission, and if so, at the next step 30 check if CallDetailRecords (CDR) is started. If not, at the next step 31 add the CSTA client in the CallDetailRecords clients list (CDRCL) and send StartCallDetailRecordsTrasmission to the PBX. If at step 30 CallDetailRecords (CDR) is started then at step 32 send to the CSTA client the Response for this type of Invoke (previously saved) and add this client in the CallDetailRecords clients list (CDRCL). If at step 29 Invoke is not StartCallDetailRecordsTransmission then at the next step 33 check if Invoke is StopCallDetailRecordsTransmission, and if so, at the next step 34 send to the CSTA client the Response for this type of Invoke and erase the CSTA client from the CallDetailRecords client list (CDRCL), and if the list becomes empty, send StopCallDetailRecordsTransmission to the PBX and CallDetailRecords (CDR) is stopped. If at step 33 Invoke is not StopCallDetailRecordsTransmission then at step 35 send the Invoke to the PBX with another generated InvokeID, kept as well in the non-processed Invokes list (LI).

Figure 5:
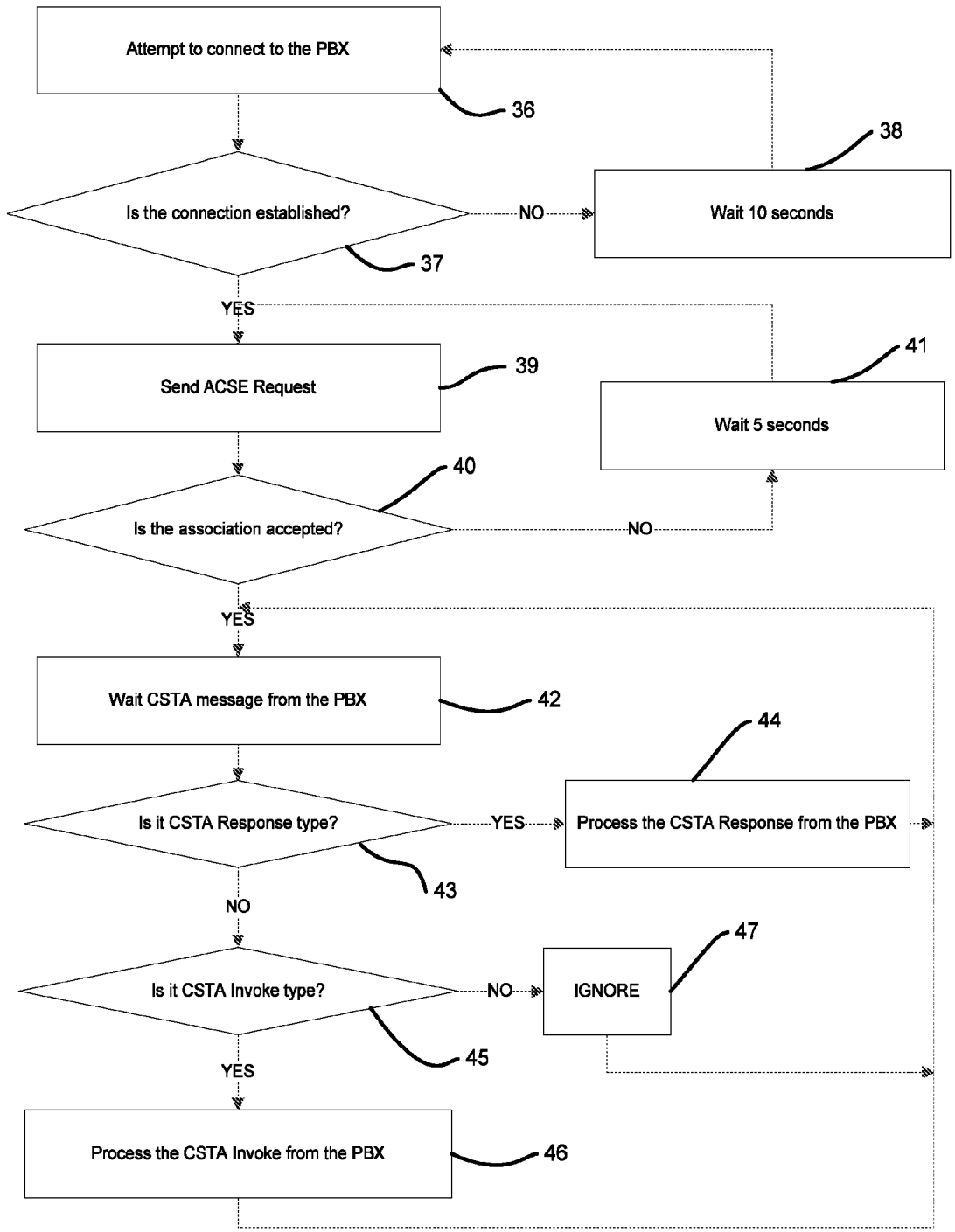
FIG. 5, functional diagram of the multiplexer method describing the communication between the SMA and the PBX.

The second dialogue process (SMA Operation B), is described in FIG. 5 and described below:

At SMA startup, at step 36, try to connect to the PBX. At the next step 37, check if the connection succeeded, and if not, through step 38, wait ten seconds and then, loop back to step 36 to retry to connect to the PBX. If at step 37 the connection of the SMA to the PBX is confirmed to be established, send through step 39 the ACSE Request message to the PBX. At the next step 40 check if the association request is accepted by the PBX. If not, wait through step 41 for five seconds and then re-execute sending the ACSE Request message through step 39. If at step 40 is confirmed that the association to the PBX is accepted, then at step 42 start waiting CSTA messages from the PBX.

For every message received from the PBX, at step 43 check if the message is CSTA Response type, and if so, at the next step 44 process the CSTA Response message from the PBX. If at step 43 it is not confirmed that the message is CSTA Response type, at the next step 45 check if the message is CSTA Invoke type. If at step 45 it is confirmed that the message is CSTA Invoke type, process at step 46 the CSTA Invoke message, and if it is not CSTA Invoke type, this message is ignored at step 47.

Figure 6:
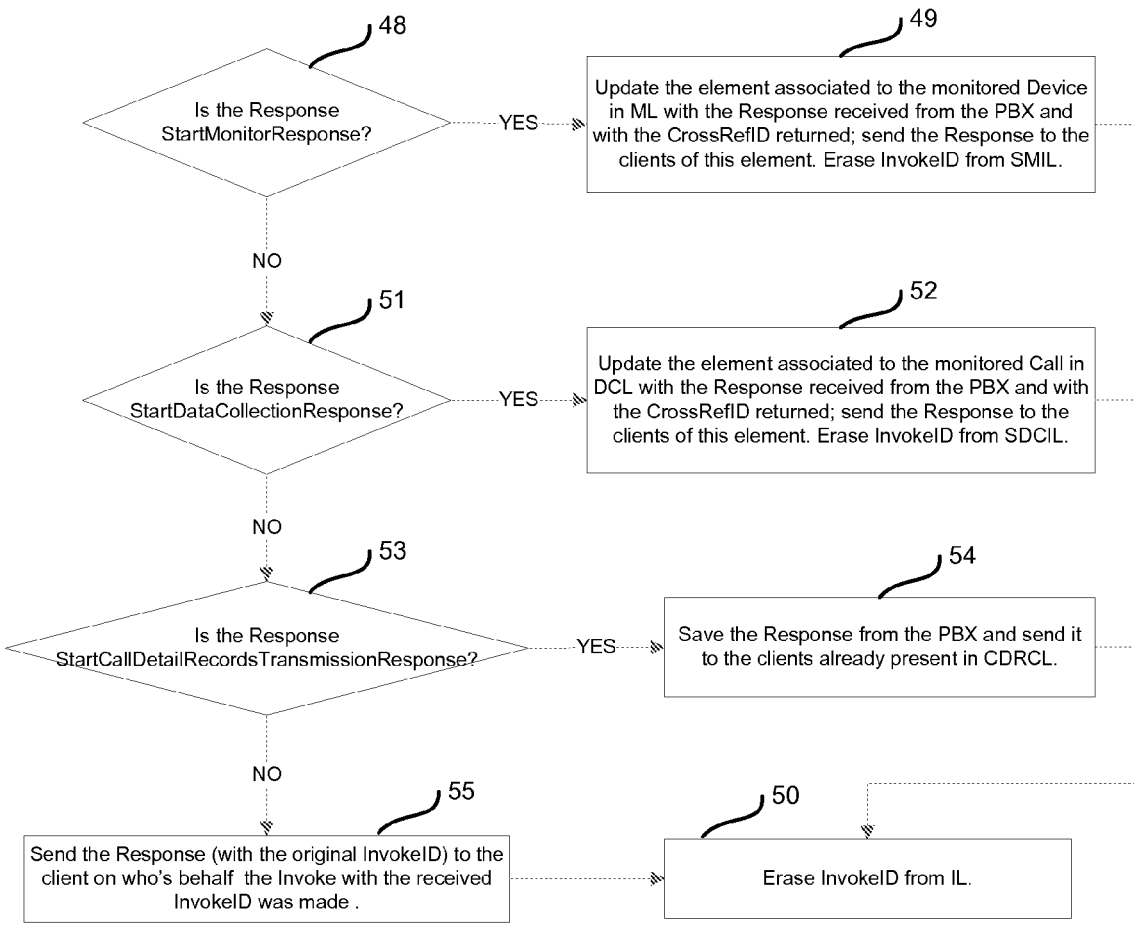
FIG. 6, processing diagram for the CSTA Response from the PBX.

The processing of the CSTA Response message from PBX, at step 44, is illustrated in FIG. 6 and described below:

At step 48 check if the Response is StartMonitorResponse, and if so, at the next step 49 find the monitored Device, by InvokeID, in the non-processed StartMonitor Invokes list (SMIL), find the element associated to the Device in the monitoring list (ML) and update it with the CrossReferenceID received and with the Response from the PBX for this element, then send this Response to the CSTA clients already present in the CSTA clients list of this element, and then erase the InvokeID from the non-processed StartMonitor Invokes list (SMIL); at step 50 erase the InvokeID from the non-processed Invokes list (IL).

If at step 48 Response is not StartMonitorResponse, then at step 51 check if the Response is StartDataCollectionResponse, and if so, at the next step 52 find the monitored Call, by InvokeID, in the non-processed StartDataCollection Invokes list (SDCIL), find the element associated to the Call in the data collecting list (DCL) and update it with the CrossReferenceID received and with the Response received from the PBX for this element, then send this Response to the CSTA clients CSTA already present in the CSTA clients list of this element, erase the InvokeID from the non-processed StartDataCollection Invokes list (SDCIL); at step 50, erase the InvokeID from the non-processed processed Invokes list (IL).

If at step 51 Response is not Start DataCollectionResponse, then pass to step 53 to check if it is StartCallDetailRecordsTransmission Response type, and if so, then at the next step 54 save the Response from the PBX and send this Response to the CSTA clients already present in the CallDetailRecord clients list (CDRCL), and after that, at step 50, erase the InvokeID from the non-processed Invokes list (IL). If at step 53 the Response is not StartCallDetailRecordsTransmissionResponse, at step 55 find the CSTA client on who's behalf the Invoke was made, by InvokeID in the non-processed Invokes list (IL) and send this Response to this CSTA client with the original InvokeID, and further, at step 50, erase the InvokeID from the non-processed Invokes list.

Figure 7:
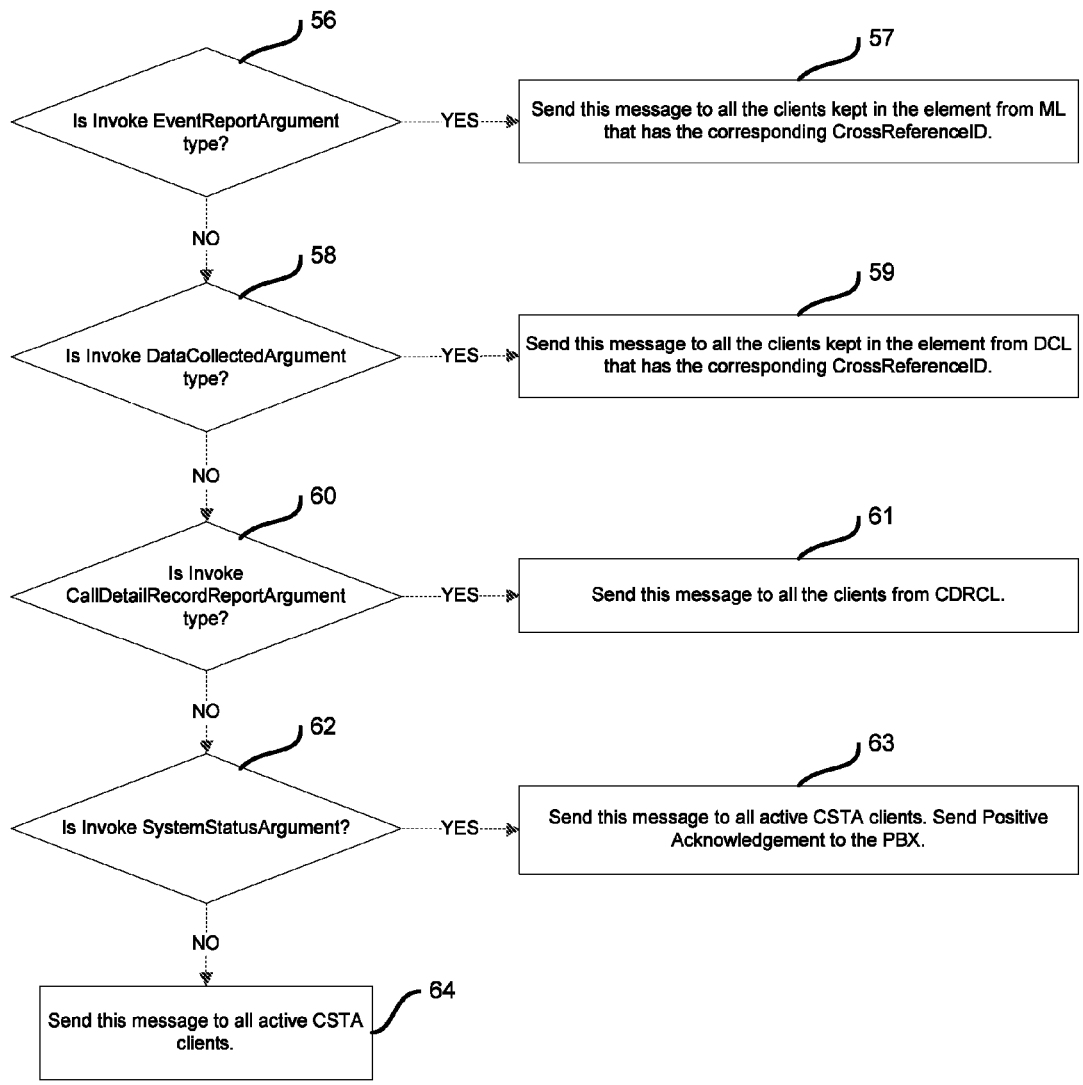
FIG. 7, processing diagram for the CSTA Invoke from the PBX.

The processing of the CSTA Invoke message from PBX, at step 46 is illustrated in FIG. 7 and described below:

At step 56 check if the Invoke is EventReportArgument type, and if so, at the next step 57 find, by CrossReferenceID, in the monitoring list (ML), the element associated to the Device for which the event was reported and send this message only to the CSTA clients from the CSTA client list of this element (that are monitoring this Device). If at step 56 the Invoke is not EventReportArgument type, at step 58 check if the Invoke is DataCollectedArgument type, and if so, at the next step 59 find, by CrossReferenceID, in the data collecting list (DCL), the element associated to the Call for which the data collecting is reported and send this message only to the CSTA clients from the CSTA clients list of this element (that are monitoring this Call).

If at step 58 the Invoke is not DataCollectedArgument type, at step 60 check if the Invoke is CallDetailRecordArgument, and if so, at the next step 61 send this message to all CSTA clients from the CallDetailRecords clients list (CDRCL). If at step 60 the Invoke is not CallDetailRecordArgument, at step 62 check if the Invoke is SystemStatusArgument type, and if so, at the next step 63 send this message to all active CSTA clients and furthermore, send Positive Acknowledgement for this Invoke to the PBX to avoid losing the connection between the SMA and the PBX. If at step 62 the Invoke is not SystemStatusArgument, at step 64 send this message to all active CSTA clients.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the following claims are desired to be protected.

The invention claimed is:

1. A system for multiplexing a CSTA connection of a Communication System with a plurality of CSTA Clients, comprising:
   a processor;
   a plurality of communications ports; and
   software enabling the processor and plurality of communications ports to:
   support a first CSTA association between the processor and Communication System;
   support one of a second-$n^{th}$ CSTA associations with each of the plurality of CSTA Clients; and
   send, receive, and process messages associated with each of the second-$n^{th}$ CSTA associations and with the first CSTA association such that communications with the plurality of CSTA Clients are multiplexed over the first CSTA association between the processor and Communication System;
   include a first list associated with a type of Invoke relating to Devices;
   receive a Start Argument for the type of Invoke for a Device from one of the plurality of CSTA Clients;
   if the Device has an associated element in the first list, send a Start Response for the type of Invoke to the one of the plurality of CSTA Clients, and if not, add an element associated to the Device to the first list, and send a Start Argument for the type of Invoke to the Communication System;
   add the one of the plurality of CSTA Clients to the associated element in the first list;
   receive a Stop Argument for the type of Invoke for a Device from one of the plurality of CSTA Clients;
   send a Stop Response for the type of Invoke to the one of the plurality of CSTA Clients;
   delete the one of the plurality of CSTA Clients from the associated element in the first list;
   if no CSTA Client is associated with the element in the first list, delete the element from the first list and send a Stop Argument for the type of Invoke to the Communication System;
   include a second list associated with non-processed Invokes;
   include a third list associated with a type of Invoke relating to Devices;
   add an InvokeID received with the Start Argument into to the second list, the InvokeID associated with the Device; and
   if the Device does not have an associated element in the first list, add the InvokeID to the third list.

2. The system of claim 1, wherein the software further enables the processor and plurality of communications ports to:
   receive a Start Response relating to a Device from the Communication System;
   locate the Device in the third list by the InvokeID; locate the associated element for the Device in first list;
   update the associated element in the first list with a Cross-ReferenceID returned with the Start Response;
   send the Start Response to the ones of the plurality of CSTA Clients associated with the element; and
   erase the InvokeID from the second list and from the third list.

3. The system of claim 2, wherein the software further enables the processor and plurality of communications ports to:
   receive an Event Argument type of Invoke from the Communication System;
   locate the associated element for the Device in the first list using the CrossReferenceID; and
   send the Event Argument to the ones of the plurality of CSTA Clients associated with the element in the first list.

4. The system of claim 1, wherein the software further enables the processor and plurality of communications ports to:
   receive a Response Invoke from one of the plurality of CSTA Clients that is not included in specified list of Response Invoke types;
   locate the associated one of the plurality of CSTA Clients in the second list and send the Response to this CSTA Client with the InvokeID; and
   erase the InvokeID from the second list.

5. The system of claim 1, wherein the software further enables the processor and plurality of communications ports to:
   receive a type of Invoke from one of the plurality of CSTA Clients that is not included in specified list of Invoke types;
   generate an InvokeID and add to the second list; and
   send the Invoke and InvokeID to the Communication System.

6. A system for multiplexing a CSTA connection of a Communication System with a plurality of CSTA Clients, comprising:
   a processor;
   a plurality of communications ports; and
   software enabling the processor and plurality of communications ports to:
   support a first CSTA association between the processor and Communication System;
   support one of a second-$n^{th}$ CSTA associations with each of the plurality of CSTA Clients; and
   send, receive, and process messages associated with each of the second-$n^{th}$ CSTA associations and with the first CSTA association such that communications with the plurality of CSTA Clients are multiplexed over the first CSTA association between the processor and Communication System;
   include a first list associated with a type of Invoke relating to Calls;
   receive a Start Argument for the type of Invoke for a Call from one of the plurality of CSTA Clients;
   if the Call has an associated element in the first list, send a Start Response for the type of Invoke to the one of the plurality of CSTA Clients, and if not, add an element associated to the Call to the first list, associate the one of the plurality of CSTA Clients to the element, and send a Start Argument for the type of Invoke to the Communication System;
add the one of the plurality of CSTA Clients to the associated element in the first list;
receive a Stop Argument for the type of Invoke for a Call from one of the plurality of CSTA Clients;
send a Stop Response for the type of Invoke to the one of the plurality of CSTA Clients;
delete the one of the plurality of CSTA Clients from the associated element in the first list;
if no CSTA Client is associated with the Call element in the first list, delete the element from the first list and send a Stop Argument for the type of Invoke to the Communication System;
include a second list associated with non-processed Invokes;
include a third list associated with a type of Invoke relating to Call;
add an InvokeID received with the Start Argument into to the second list, the InvokeID associated with the Call; and
if the Call does not have an associated element in the first list, add the InvokeID to the third list.

7. The system of claim 6, wherein the software further enables the processor and plurality of communications ports to:
receive a Start Response relating to a Call from the Communication System; locate the Call in the third list by the InvokeID; locate the associated element for the Call in first list;
update the associated element in the first list with a CrossReferenceID returned with the Start Response;
based on the type of Invoke, either send the Start Response to the ones of the plurality of CSTA Clients associated with the element for the Call or send the Start Response to the one of the plurality of CSTA Clients associated with the InvokeID in the first list; and
erase the InvokeID from the second list and from the third list.

8. The system of claim 7, wherein the software further enables the processor and plurality of communications ports to:
receive a DataCollected Argument type of Invoke from the Communication System;
locate the associated element for the Call in the first list using the CrossReferenceID; and
send the DataCollected Argument to the ones of the plurality of CSTA Clients associated with the element in the first list.

9. A system for multiplexing a CSTA connection of a Communication System with a plurality of CSTA Clients, comprising:
a processor;
a plurality of communications ports; and
software enabling the processor and plurality of communications ports to:
support a first CSTA association between the processor and Communication System;
support one of a second-$n^{th}$ CSTA associations with each of the plurality of CSTA Clients; and
send, receive, and process messages associated with each of the second-$n^{th}$ CSTA associations and with the first CSTA association such that communications with the plurality of CSTA Clients are multiplexed over the first CSTA association between the processor and Communication System;
include a first list associated with a type of Invoke relating to CallsDetailRecords;
receive a StartCallDetailRecords Transmission from one of the plurality of CSTA Clients;
if CallsDetailRecords exists, send saved Response to the one of the plurality of CSTA Clients, and if not, send a StartCallsDetailRecords Transmission to the Communication System;
add the one of the plurality of CSTA Clients to the first list;
receive a StopCallsDetailRecords Transmission for the type of Invoke for a Call from one of the plurality of CSTA Clients;
send a StopCallsDetailRecords Transmission Response for the type of Invoke to the one of the plurality of CSTA Clients;
delete the one of the plurality of CSTA Clients from the associated element in the first list;
if no CSTA Client is associated with the element in the Call, delete the element from the first list, send a StopCallsDetailRecords Transmission for the type of Invoke to the Communication System, and stop CallsDetailRecords;
include a second list associated with non-processed Invokes;
add an InvokeID received with the StartCallDetailRecords Transmission to the second list, the InvokeID associated with the Call;
receive a StartCallDetailRecords Transmission Response relating to a Device from the Communication System;
save the Response;
send the Start Response to the ones of the plurality of CSTA Clients associated with the element; and
delete the InvokeID from the second list.

* * * * *